United States Patent
Wilson et al.

(10) Patent No.: US 11,143,427 B2
(45) Date of Patent: Oct. 12, 2021

(54) FAN MOTOR CONTROL

(71) Applicant: Johnson Controls Technology Company, Auburn Hills, MI (US)

(72) Inventors: Timothy J. Wilson, Saint Petersburg, FL (US); Joshua J. Yagy, St. Petersburg, FL (US)

(73) Assignee: Johnson Controls Technology Company, Auburn Hills, MI (US)

( * ) Notice: Subject to any disclaimer, the term of this patent is extended or adjusted under 35 U.S.C. 154(b) by 98 days.

(21) Appl. No.: 16/185,390

(22) Filed: Nov. 9, 2018

(65) Prior Publication Data

US 2020/0132331 A1  Apr. 30, 2020

Related U.S. Application Data

(60) Provisional application No. 62/751,286, filed on Oct. 26, 2018.

(51) Int. Cl.
| | |
|---|---|
| *G05B 19/042* | (2006.01) |
| *F24F 11/77* | (2018.01) |
| *F24F 11/75* | (2018.01) |
| *F24F 11/63* | (2018.01) |
| *F24F 13/24* | (2006.01) |
| *F24F 140/60* | (2018.01) |

(52) U.S. Cl.
CPC .............. *F24F 11/77* (2018.01); *F24F 11/63* (2018.01); *F24F 11/75* (2018.01); *F24F 13/24* (2013.01); *G05B 19/042* (2013.01); *F24F 2140/60* (2018.01); *G05B 2219/2614* (2013.01)

(58) Field of Classification Search
None
See application file for complete search history.

(56) References Cited

U.S. PATENT DOCUMENTS

| | | | |
|---|---|---|---|
| 6,051,941 | A  | 4/2000  | Sudhoff et al. |
| 6,353,303 | B1 | 3/2002  | Ramachandran et al. |
| 6,459,940 | B1 | 10/2002 | Ghorbel et al. |
| 6,504,338 | B1 | 1/2003  | Eichorn |
| 7,161,316 | B2 | 1/2007  | Archer et al. |
| 8,143,828 | B2 | 3/2012  | Becerra et al. |
| 8,251,671 | B2 | 8/2012  | Shizuo et al. |
| 8,297,068 | B2 | 10/2012 | Yokouchi et al. |
| 8,672,733 | B2 | 3/2014  | Chen et al. |
| 8,880,224 | B2 | 11/2014 | Eaton et al. |
| 8,920,132 | B2 | 12/2014 | Havard, Jr. |
| 9,461,576 | B2 | 10/2016 | Ishikawa |

(Continued)

OTHER PUBLICATIONS

Laughman et al, "A two-step method for estimating the parameters of induction machine models," Sep. 20-24, 2009, pp. 262-269.

*Primary Examiner* — Ryan A Jarrett

(74) *Attorney, Agent, or Firm* — Fletcher Yoder, P.C.

(57) ABSTRACT

A heating, ventilation, and/or air conditioning (HVAC) system includes a motor configured to drive rotation of a fan, and an HVAC controller configured to control operation of the HVAC system. The HVAC controller is configured to determine an operating mode target value of the HVAC system, calculate an operating parameter target value of the motor based on the operating mode target value of the HVAC system and a control algorithm of the HVAC controller, and control operation of the motor toward or at the operating parameter target value.

30 Claims, 9 Drawing Sheets

(56) References Cited

U.S. PATENT DOCUMENTS

| | | | |
|---|---|---|---|
| 9,763,551 B2 | 9/2017 | Murchie et al. | |
| 10,425,029 B1* | 9/2019 | Beifus | H02P 23/0027 |
| 2003/0042860 A1* | 3/2003 | Sulfstede | F04D 27/004 |
| | | | 318/432 |
| 2005/0280384 A1* | 12/2005 | Sulfstede | F04D 27/004 |
| | | | 318/432 |
| 2007/0248467 A1* | 10/2007 | Shahi | F04D 27/004 |
| | | | 417/1 |
| 2008/0185986 A1* | 8/2008 | Marcinkiewicz | H02P 6/10 |
| | | | 318/807 |
| 2009/0082908 A1* | 3/2009 | Green | F24F 11/62 |
| | | | 700/276 |
| 2010/0070205 A1* | 3/2010 | Shahi | F24F 11/77 |
| | | | 702/45 |
| 2014/0265956 A1* | 9/2014 | Chretien | H02P 21/05 |
| | | | 318/400.15 |
| 2015/0211760 A1* | 7/2015 | Wang | F24F 11/30 |
| | | | 700/276 |
| 2015/0233380 A1 | 8/2015 | Sasaki et al. | |
| 2016/0040679 A1 | 2/2016 | Wang et al. | |
| 2018/0328370 A1* | 11/2018 | Beifus | F04D 27/001 |

* cited by examiner

FAN MOTOR CONTROL

CROSS REFERENCE TO RELATED APPLICATIONS

This application claims priority from and the benefit of U.S. Provisional Application Ser. No. 62/751,286, entitled "FAN MOTOR CONTROL," filed Oct. 26, 2018, which is hereby incorporated by reference in its entirety for all purposes.

BACKGROUND

A wide range of applications exists for heating, ventilation, and/or air conditioning (HVAC) systems. For example, residential, light commercial, commercial, and industrial systems are used to control temperatures and air quality in residences and buildings. Generally, HVAC systems may utilize a working fluid, such as a refrigerant or water, to heat and/or cool an airflow. For example, the HVAC system may circulate a refrigerant through a closed loop between an evaporator coil where the fluid absorbs heat and a condenser where the fluid releases heat. The fluid flowing within the closed loop is generally formulated to undergo phase changes within the normal operating temperatures and pressures of the system, so that quantities of heat can be exchanged by virtue of the latent heat of vaporization of the fluid. Alternatively, a chiller may be used to supply cooled water, and/or a boiler may be used to supply heated water, where the temperature-controlled water is directed toward a heat exchanger. In either embodiment, a fan or fans may blow air over the heat exchanger(s) in order to condition the air.

In traditional embodiments, a fan motor of the fan may include a fan motor controller which operates to determine a fan motor setting. The traditional fan motor controller may be integrated with the fan motor and distinct from a general HVAC controller, such as a Direct Digital Control (DDC) controller, which may operate other aspects of the HVAC system, such as a damper or valve. Unfortunately, the above-described traditional embodiments may have limited functionality, and may be costly and inefficient. Thus, it is now recognized that improved fan motor control is desired.

The description above is intended to introduce the reader to various aspects of art that may be related to various aspects of the present disclosure, which are described below. The discussion in this section is believed to be helpful in providing the reader with background information to facilitate a better understanding of the various aspects of the present disclosure. Accordingly, it should be understood that these statements are to be read in this light, and not as admissions of prior art.

SUMMARY

The present disclosure relates to a heating, ventilation, and/or air conditioning (HVAC) system. The HVAC system includes a motor configured to drive rotation of a fan, and an HVAC controller configured to control operation of the HVAC system. The HVAC controller is configured to determine an operating mode target value of the HVAC system, calculate an operating parameter target value of the motor based on the operating mode target value of the HVAC system and a control algorithm of the HVAC controller, and control operation of the motor toward or at the operating parameter target value.

The present disclosure also relates to a control system for a heating, ventilation, and/or air conditioning (HVAC) system. The control system includes a controller configured to receive an operating mode target value of the HVAC system, calculate an operating parameter target value of a fan motor based on the operating mode target value and a control algorithm, control the fan motor toward or at the operating parameter target value, and control an additional HVAC control aspect separate from operation of the fan motor.

The present disclosure also relates to a non-transitory, computer readable storage media having computer-executable instructions that, when executed by a processor, perform a method for controlling a heating, ventilation, and/or air conditioning (HVAC) system. The instructions include receiving an operating mode target value of the HVAC system. The instructions also include determining, based on the operating mode target value and a control algorithm, an operating parameter target value of a motor configured to drive rotation of a fan. The instructions also include controlling the motor toward or at the operating parameter target value. The instructions also include controlling at least one additional HVAC control aspect separate from operation of the motor.

DRAWINGS

Figure 11:
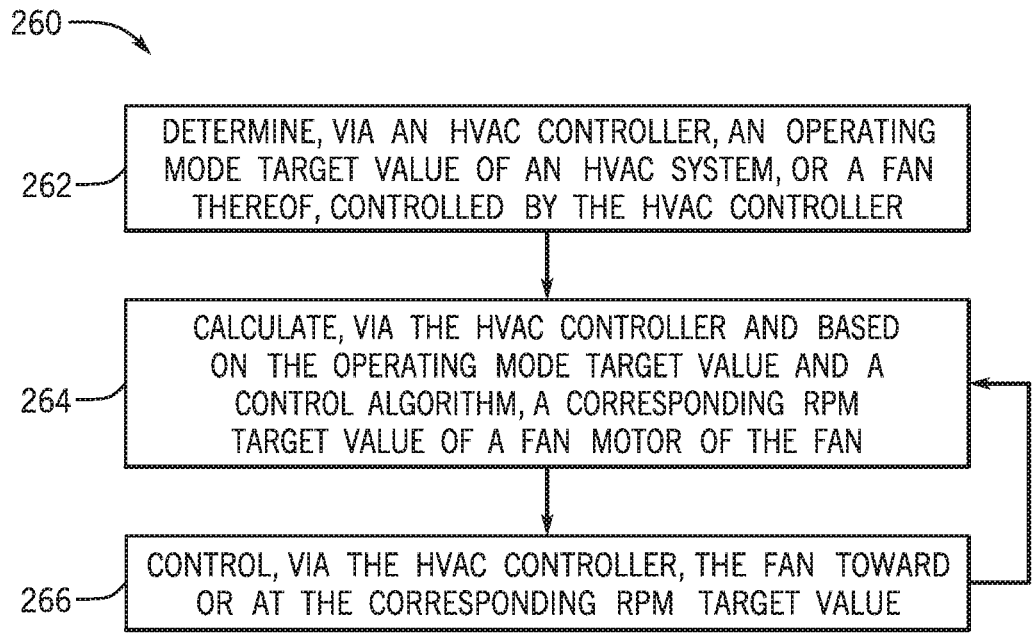
Figure 12:
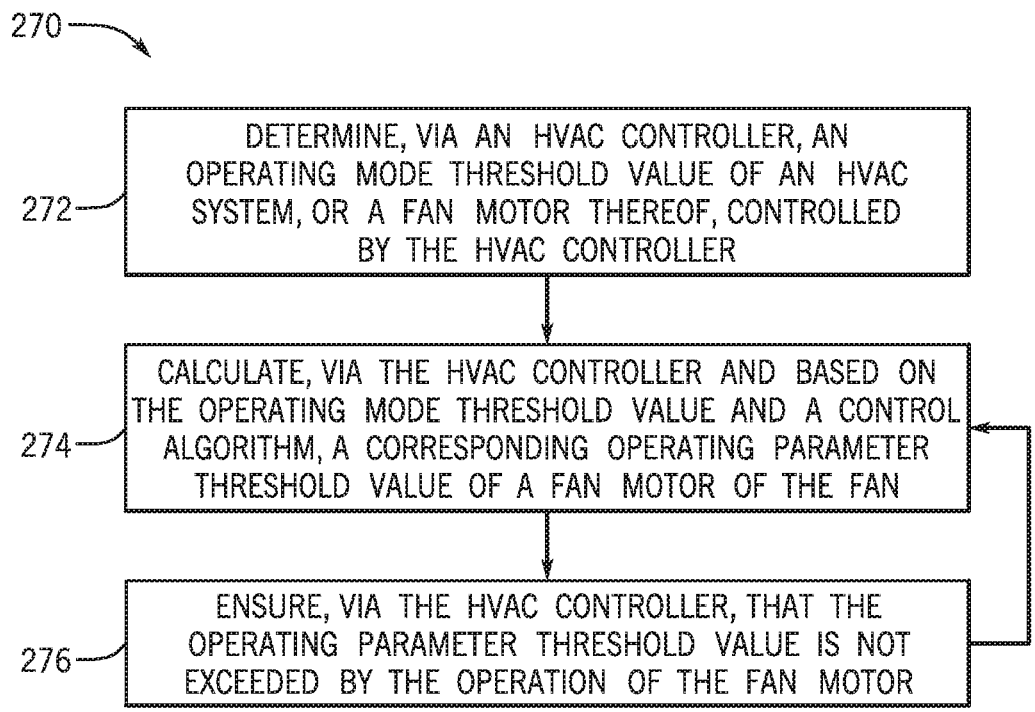

FIG. 11 is a process flow diagram illustrating a method of controlling a fan motor, via an HVAC controller and based on an operating mode target value and control algorithm, in accordance with embodiments described herein; and FIG. 12 is a process flow diagram illustrating a method of controlling a fan motor, via an HVAC controller and based on an operating mode target value and control algorithm, in accordance with embodiments described herein.

DETAILED DESCRIPTION

The present disclosure is directed generally toward heating, ventilation, and/or air conditioning (HVAC) systems, and more specifically to fan control by the HVAC system.

In traditional HVAC systems, a fan or fan motor may include a fan motor controller which operates to determine a fan motor setting of the fan. The traditional fan motor controller may be integrated with the fan motor and/or distinct from a general HVAC controller, which may operate other aspects of the HVAC system, such as a damper or valve. It is now recognized that employing a separate motor controller may be costly, inefficient, and may limit functionality of the HVAC system and corresponding fan.

In accordance with the present disclosure, fan motor operation may be programmed into the control logic of an HVAC controller in ways that reduce a cost and/or improve functionality of the HVAC system. It is presently recognized that, if the torque output and revolutions-per-minute (RPM) of a fan motor, such as an electronically commutated (EC) constant torque fan motor, in an HVAC system are known, the fan's airflow, power consumption, and sound output in the HVAC system can be determined. For example, following a baselining procedure for a particular fan in an HVAC system, the fan's airflow, power consumption, and sound output in the HVAC can be determined from the fan motor's torque output and RPM. Conversely, if a constant airflow mode target value, constant power consumption mode target value, or constant sound output mode target value is desired, the required torque output and/or RPM to meet the operating mode target value can be determined/calculated based on correlations, or control algorithms, identified by the baselining procedure. As will be appreciated in view of the detailed description with respect to the drawings, the control algorithm may be employed via an iterative process which seeks to determine/calculate the appropriate RPM and torque output based on one of the above-described operating mode target values. The baselining procedure for formulating the control algorithm may involve, for example, operating the fan in a controlled HVAC system and over a range of RPM and torque values, recording airflow, power, and sound parameters, and determining control algorithm coefficients which are indicative of fan design.

After developing the control algorithm and corresponding coefficients via the baselining procedure, the control algorithm(s) can be employed to calculate the appropriate torque output of the fan to achieve constant airflow operation at a targeted constant airflow value, constant sound operation at a targeted sound output value, constant power operation at a targeted power consumption value, or some other operating mode target value. It should be noted that the above-described determinations may be pressure-independent determinations. That is, a torque output target value, for example, can be calculated from the constant airflow mode target value, constant power consumption mode target value, or constant sound output mode target value without static control, instead employing two variable, non-linear regression analysis in accordance with present embodiments. Further, the control logic noted above and described in detail below may be employed for a constant torque, EC motor as noted above, although other types of fan motors may be utilized in accordance with the present disclosure. Presently contemplated embodiments may improve efficiency, reduce cost, and enable improved HVAC functionality over traditional embodiments. These and other features will be described in detail below with reference to the drawings.

Figure 1:
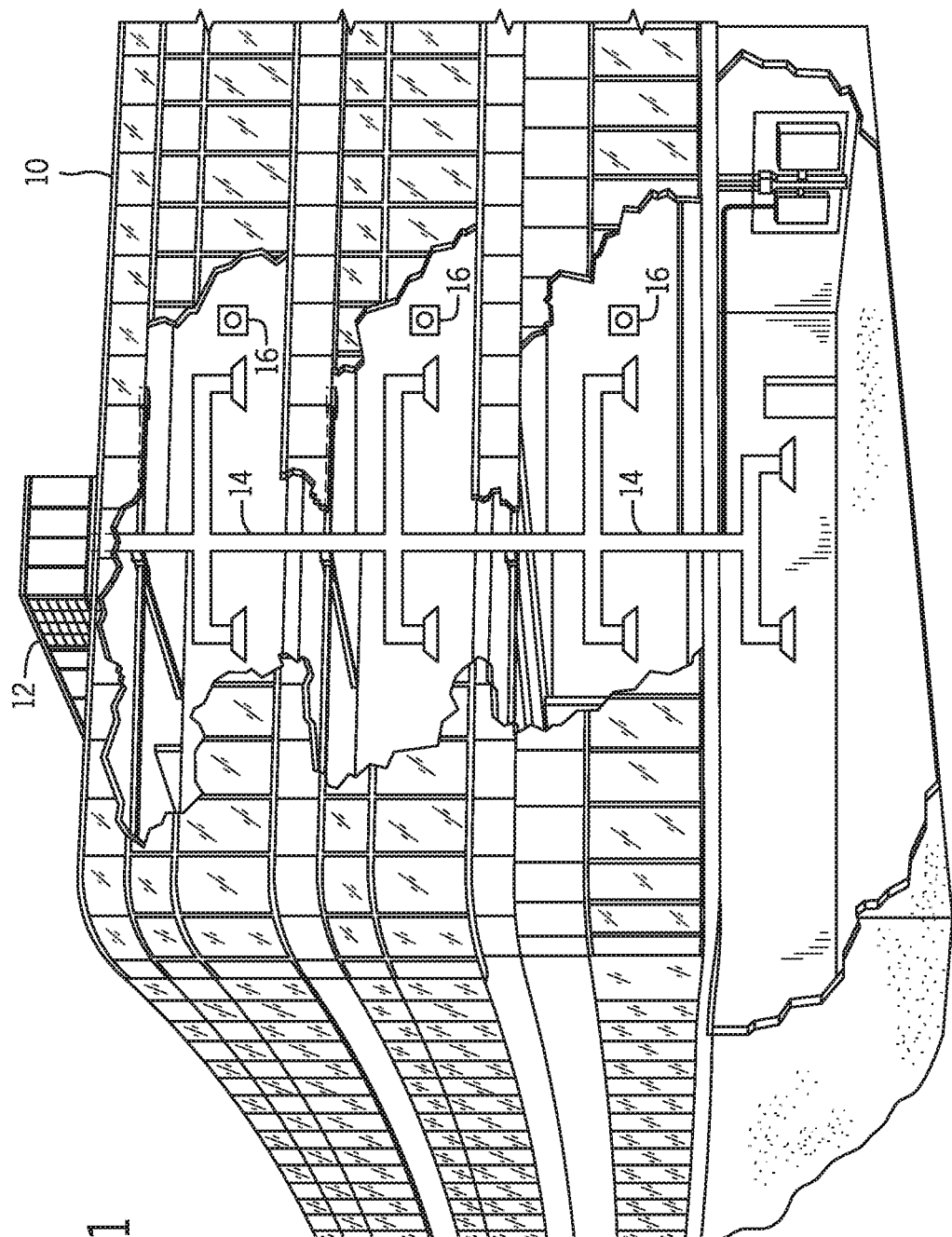
FIG. 1 is a perspective view a heating, ventilation, and air conditioning (HVAC) system for building environmental management, in accordance with embodiments described herein.

FIGS. 1-4, discussed in detail below, are directed toward HVAC systems which may utilize the presently contemplated fan motor control features. FIGS. 1-4 may be described below with an emphasis on refrigerant-based HVAC systems. However, it should be understood that the disclosed HVAC systems may alternatively employ other working fluids, such as water, to control a temperature of an airflow. That is, a chiller may be used to cool water, and/or a boiler may be used to heat water, and the temperature-controlled water may be used as a working fluid to cool/heat an airflow. Further to this point, it should be understood that the fan motor control features disclosed herein are applicable to water-based and refrigerant-based HVAC systems. Turning now to the drawings, FIG. 1 illustrates a heating, ventilation, and air conditioning (HVAC) system for building environmental management that may employ one or more HVAC units. In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that may implement a refrigeration or water cycle to provide conditioned air to the building 10. Specifically, the HVAC unit 12 may include one or more heat exchangers across which an airflow is passed to condition the airflow before the airflow is supplied to the building. In the illustrated embodiment, the HVAC unit 12 is a rooftop unit (RTU) that conditions a supply air stream, such as environmental air and/or a return airflow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream. In still other embodiments, a chiller may be utilized to cool water, a boiler may be utilized to heat water, and the temperature-controlled water may be utilized to cool and heat, respectively, the airflow.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
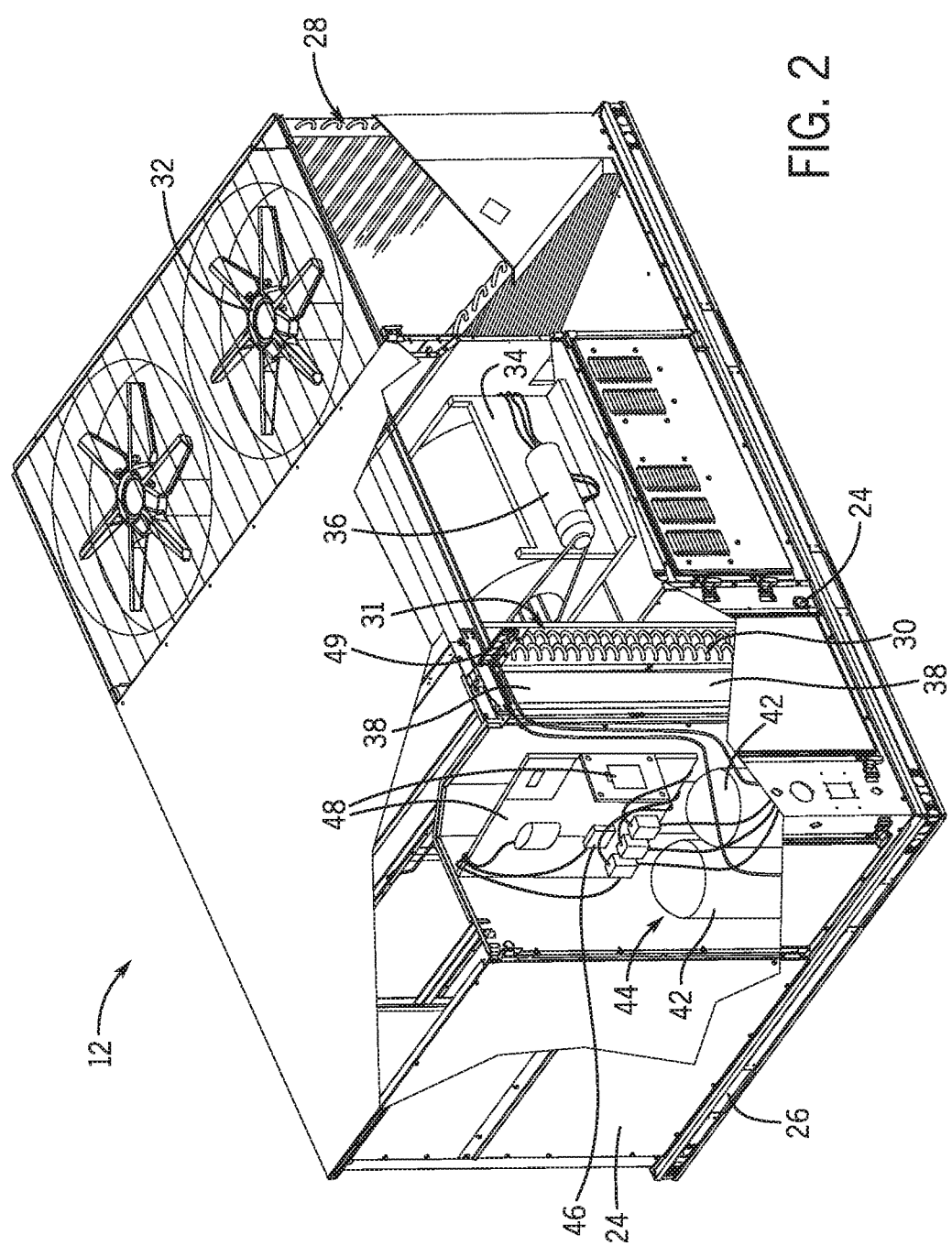
FIG. 2 is a perspective view of an HVAC unit, in accordance with embodiments described herein.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant through the heat exchangers 28 and 30. For example, the refrigerant may be R-410A. However, as previously described, the illustrated HVAC unit 12 may employ, in another embodiment, similar features of a water-based system. The tubes may be of various types, such as multichannel and/or microchannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the airflows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned airflows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
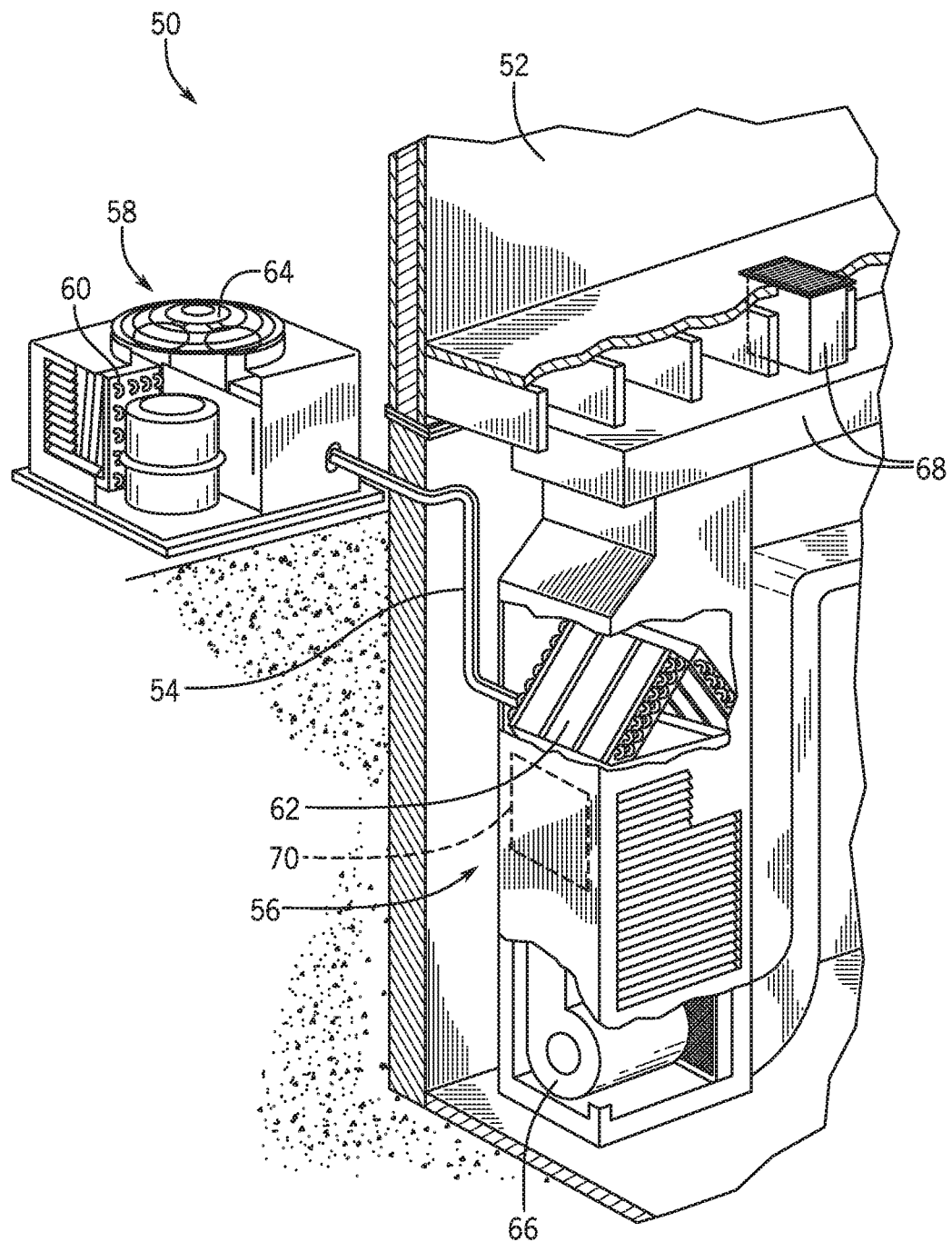
FIG. 3 is a perspective view of a residential split heating and cooling system, in accordance with embodiments described herein.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction. Although FIG. 3 is discussed above and below in the context of a refrigerant-based system, similar features may be employed in another residential system utilizing water-based features, as previously described.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
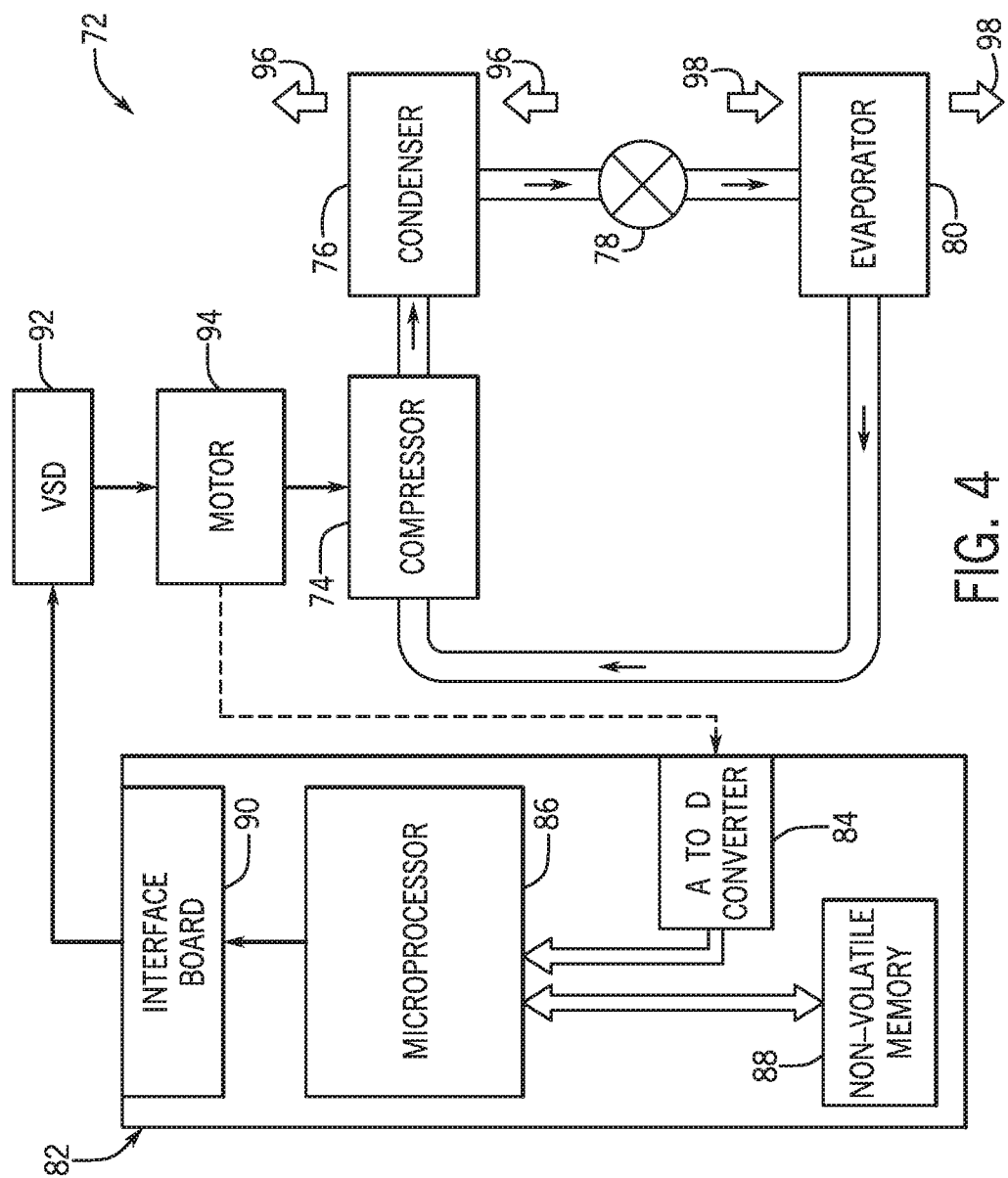
FIG. 4 is a schematic diagram of a vapor compression system that may be used in an HVAC system, in accordance with embodiments described herein.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications. In particular, presently contemplated fan motor control features can be employed in water-based HVAC systems which employ, for example, a chiller to cool water and a boiler to heat water.

Further, any of FIGS. 1-4 may include, in accordance with an aspect of the present disclosure, an HVAC controller configured to operate aspects of a fan motor, such as a constant torque, electronically commutated (EC) motor. The HVAC controller may be configured to control other aspects of the HVAC system, such as a damper or valve, in addition to aspects of the fan motor.

With respect to the fan motor, fan motor operation parameters or models may be programmed into the control logic of the HVAC controller. It is presently recognized that, if the torque output and revolutions-per-minute (RPM) of a fan motor, such as the above-described constant torque, EC fan motor, in an HVAC system are known, the fan's airflow, power consumption, and sound output in the HVAC system can be determined. For example, following a baselining procedure for a particular fan in an HVAC system, the fan's airflow, power consumption, and sound output in the HVAC can be determined from the fan motor's torque output and RPM. Conversely, if an airflow mode target value, power consumption mode target value, or sound output mode target value is desired, the required torque output and/or RPM to meet the operating mode target value can be determined/calculated based on correlations, or control algorithms, identified by the baselining procedure. The above-described determinations may be pressure-independent determinations. That is, a torque output or RPM target value, for example, can be determined from the airflow mode target value, the power consumption mode target value, or the sound output mode target value without static control, instead employing two variable, non-linear regression analysis in accordance with present embodiments. Presently contemplated embodiments may improve efficiency, reduce cost, and enable improved HVAC functionality over traditional embodiments. These and other features will be described in detail below with reference to the drawings.

Figure 5:
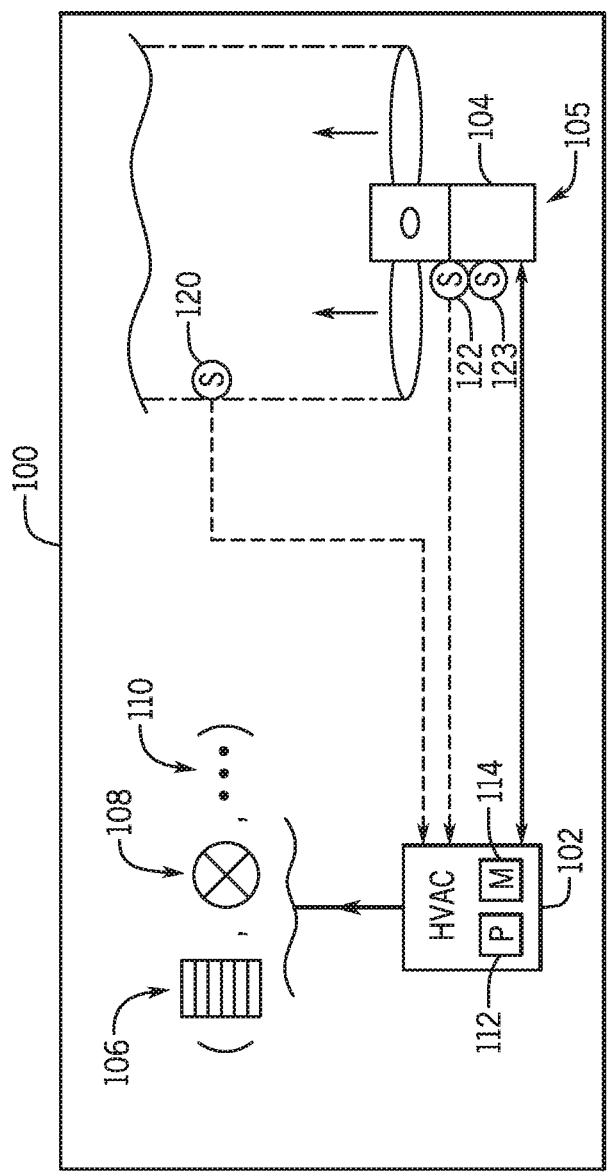
FIG. 5 is a schematic diagram of an HVAC system utilizing an HVAC controller to control a fan motor, in accordance with embodiments described herein.

FIG. 5 is a schematic diagram of an embodiment of an HVAC system 100 utilizing an HVAC controller 102 to control a fan motor 104, such as a constant torque, electronically commutated (EC) fan motor, of a fan 105 of the HVAC system 100. As shown, the HVAC controller 102 controls other aspects of the HVAC system 100, such as a setting of a damper 106, a setting of a valve 108, or another aspect 110 of the HVAC system 100. Further, the HVAC controller 102, in the illustrated embodiment, is not resident on the fan motor 104. The HVAC controller 102 in FIG. 5 may be, for example, a part of control device 16 in FIGS. 1-4.

The HVAC controller 102 may include a processor 112 and a memory 114. The memory 114 may include instructions stored thereon that, when executed by the processor 112, cause the controller 102 to carry out certain acts. For example, in accordance with the present disclosure, the HVAC controller 102 may receive an operating mode target value and input the operating mode target value into a fan control algorithm. The operating mode target value may be received as a demand by which the HVAC controller 102 seeks to meet through control of the fan motor 104, via the fan control algorithm. The fan control algorithm may facilitate calculation of desired fan operating parameters, such as torque output or RPM of the fan motor, which correspond to the operating mode target value. The fan control algorithm or model may be developed during testing or baselining of the fan motor 104. That is, during the baselining procedure, the fan motor 104 may be installed in the HVAC system 100 or a comparable HVAC system, and tested over a range of RPM and torque values, recording airflow, power, and sound parameters with respect to the RPM and torque values, and determining control algorithm coefficients which are indicative of fan design. In some embodiments, the fan control algorithm or model may facilitate calculation of a parameter indicative of torque output, such as amperes, back EMF, or PWM input.

For example, the fan control algorithm may receive the operating mode target value, and may also receive feedback regarding the actual RPM or speed of the fan 105. The HVAC controller 102 may then solve the fan control algorithm for the target torque output, or for a parameter indicative of torque, such as amperes, back EMF, or PWM input, by inputting the operating mode target value and the detected RPM into the fan control algorithm. The HVAC controller 102 may then control the fan motor 104 toward or at the calculated torque output target value. This may be achieved in certain embodiments with a voltage signal (e.g., in a range of 2-10 Volts) that is scaled for input to achieve desired results from the fan motor 104. In controlling the fan motor 104 toward or at the calculated torque output target value, the RPM of the fan 105 may change. Thus, the HVAC controller 102 may again employ the fan control algorithm, which receives the same operating mode target value and the newly detected RPM, and again solves for the torque output target value, or the parameter indicative of torque output, such as amperes, back EMF, or PMW. The HVAC controller 102 may then control then fan motor 104 at the newly calculated torque output target value, which may be correlated to an appropriate signal (e.g., within the 2-10 Volt range). In doing so, the RPM of the fan 105 may change. This iterative process may be repeated until no change in the input to the fan motor 104 is required; that is, until the actual operating torque output is already substantially equal to the calculated torque output by which the controller 102 would otherwise seek to control the fan motor 104. Provided below are descriptions of various operating modes contemplated by the present disclosure, such as constant airflow, constant power, constant sound output, and constant total or external static pressure, among other embodiments, followed by a general description of an example fan control algorithm employed across the various operating modes.

Similarly, in an embodiment employing a constant RPM motor instead of a constant torque motor, the fan control algorithm may receive the operating mode target value, and may also receive feedback regarding the actual torque output of the fan 105. The HVAC controller 102 may then solve the fan control algorithm for the target RPM by inputting the operating mode target value and the detected torque output into the fan control algorithm. The HVAC controller 102 may then control the fan motor 104 toward or at the calculated torque output target value. This may be achieved in certain embodiments with a signal that is scaled for input to achieve desired results from the fan motor 104. In controlling the fan motor 104 toward or at the calculated RPM target value, the torque output of the fan 105 may change. Thus, the HVAC controller 102 may again employ the fan control algorithm, which receives the same operating mode target value and the newly detected torque output, and again solves for the RPM target value. The HVAC controller 102 may then control then fan motor 104 at the newly calculated RPM target value, which may be correlated to an appropriate signal. In doing so, the torque output of the fan 105 or fan motor 104 may change. This iterative process may be repeated until no change in the input to the fan motor 104 is required; that is, until the actual operating RPM is already substantially equal to the calculated RPM target by which the controller 102 would otherwise seek to control the fan motor 104. Provided below are descriptions of various operating modes contemplated by the present disclosure, such as constant airflow, constant power, and constant sound output modes, followed by a general description of an example fan control algorithm employed across the various operating modes. It should be noted that certain embodiments described herein may emphasize the constant torque motor embodiment by which the fan control algorithm receives the detected RPM and calculates the target torque output, but that the fan control algorithm and embodiments contemplated by this disclosure are also applicable to the constant RPM motor embodiment by which the fan control algorithm receives the detected torque output and calculates the target RPM.

Continuing from the description above, the HVAC controller 102 may receive an operating mode target value relating to a constant airflow mode target value. The constant airflow mode target value may include units of cubic feet per minute (CFM), and may describe a desired airflow output by the fan of the HVAC system. The fan control algorithm or model may receive the constant airflow mode target value, and may receive the operating RPM which is, for example, detected by a speed sensor. The fan control algorithm may then calculate or output a desired fan operating parameter target value, such as a value for torque output. In some embodiments, the fan control algorithm or model may calculate or output a parameter indicative of torque output, such as amperes, back EMF, or PWM input. The HVAC controller 102 may then control the fan motor 104 to change the torque output to the calculated torque output target value. As noted above, the change to the torque output may also change the RPM of the fan 105 and corresponding motor 104. Thus, the fan control algorithm may again be employed to receive the constant airflow mode target value and the newly detected RPM, in order to again calculate the desired torque output target value. This iterative process may be repeated until the actual operating torque output is already substantially equal to the calculated torque output target value, such that no change is required.

Additionally or alternatively, the HVAC controller 102 may receive an operating mode target value relating to a constant power consumption mode target value, for example, in Watts, as opposed to the above-described constant airflow mode target value. The constant power consumption mode target value may describe a desired power consumption by the fan motor of the HVAC system. Additionally or alternatively, the HVAC controller 102 may receive an operating mode target demand relating to a constant sound output mode target value, for example measured in decibels (dB), as opposed to the above-described constant airflow mode target value and the above-described constant power consumption mode target value. The constant sound output mode target value may refer to inlet sound, discharge sound, radiated sound, or a combination of inlet, discharge and/or radiated sound. The constant power consumption mode target value and the constant sound output mode target value may be input to a fan control algorithm or model similar to the constant airflow mode target value noted above. Constant external static pressure may also be an operating mode target value that can be employed in a fan control algorithm or model in accordance with the present disclosure.

It should be noted that embodiments described below may emphasize "constant" operating mode target values, but that other operating modes contemplated by the present disclosure may not exclusively seek to regulate the fan motor 104 toward a constant operating mode target value. That is, airflow target values may change over time, and the fan control algorithm may regulate operation of the fan motor toward the time-dependent airflow target value. In other words, the airflow target value may not necessarily be constant, and reference to the constant operating mode target values is provided as an example to clarify contemplated embodiments. Later embodiments, such as the embodiment illustrated in FIG. 13, are illustrative of methods by which the fan control algorithm could be used in contexts other than the "constant" operating mode target value, such as for calculating threshold or boundary values within which the HVAC controller 102 seeks to operate the fan motor 104. An example fan control algorithm is described in detail immediately below, with emphasis on the constant operating mode target values.

In the embodiments described above, the HVAC controller 102 may utilize a fan control algorithm or model to calculate a torque output target value of the fan motor 104 corresponding to an operating mode target value and detected RPM, where the operating mode target value is, for example, a constant airflow mode target value, a constant power consumption mode target value, or a constant sound output mode target value. In accordance with the present disclosure, the fan control algorithm or model is as follows:

$$Z = A*\log(X) + B*\sqrt{\log(X)} + C*\log(Y) + D*\sqrt{\log(Y)}, \quad \text{Equation 1}$$

where Z=the operating mode target value, X=a detected operating parameter (e.g., RPM), Y=a calculated target parameter (e.g., a torque output target, or parameter indicative thereof), and A, B, C, and D are coefficients dependent on fan design and Z. It should be noted that Equation 1 may be applied for a constant torque motor whereby X=a detected RPM and Y=a calculated torque output target, but that Equation 1 may also be applied in another context for a constant RPM motor whereby X=a detected torque output and Y=a calculated torque output target. Descriptions below may emphasize embodiments having the constant torque motor (e.g., where X=a detected RPM value and Y=a calculated torque output target value, or parameter indicative thereof) for purposes of clarity, but it should be understood that the same or similar concept applies to a constant RPM motor (e.g., where X=a detected torque output value, or parameter indicative thereof, and Y=a calculated RPM value). Further, Equation 1 is applicable to each of the operating modes contemplated by the present disclosure. That is, Equation 1 is applicable to all of the operating modes contemplated by the present disclosure, including but not limited to embodiments where Z may be equal to the constant airflow mode target value, constant power consumption mode target value, constant sound output mode target value, or some other operating mode target value such as total or external static pressure. In some embodiments, an intercept constant (E) may be added to the right side of Equation 1 to improve operation. As noted above, coefficients A, B, C, and D are different for each selection of Z and are dependent on fan design. That is, each operating mode includes a difference set of coefficients A, B, C, and D, which are dependent in part on the selection of operating mode target value Z, for example selecting Z=a constant airflow mode target value, Z=a constant sound output mode target value, or Z=a constant power consumption mode target value. The coefficients A, B, C, and D may be developed during a baselining or testing procedure in which the fan is installed and tested in the HVAC system, as previously described. Speed sensor 122, such as an optical sensor, may be employed in order to detect the RPM of the fan 105 or corresponding motor 104, and the HVAC controller 102 may receive the detected RPM data from the speed sensor 122. In some embodiments, the speed sensor 122 and/or other sensors such as an airflow sensor 120 may also be employed and communicatively coupled with the HVAC controller 102, in order to provide data feedback to the HVAC controller 102 suitable for the HVAC controller 102 to detect a need for cleaning or maintenance of the system, which will be described in detail with reference to FIG. 10. However, fan control in accordance with the present disclosure may be generally conducted without pressure feedback.

As previously described, the fan control algorithm of Equation 1 may be employed via an iterative process which controls the fan motor 104 toward a torque output and RPM suitable for the constant operating mode target value. For example, the HVAC controller 102 may receive the operating mode target value and input the operating mode target value as Z in Equation 1. The HVAC controller 102 may also receive the RPM data from the speed sensor 122, and input the RPM as X in Equation 1. The HVAC controller 102 may then solve the fan control algorithm in Equation 1 for Y, which is torque or a parameter indicative of torque. The HVAC controller 102 may then control the fan motor 104 toward or at the calculated torque output target value. As the HVAC controller 102 controls the fan motor 104 to change the torque output, the RPM may change. Thus, the HVAC controller 102 may again enter the operating mode target value as Z in Equation 1, may enter the newly detected RPM as X in Equation 1, and may solve for Y. The HVAC controller 102 may then control the fan motor 104 toward or at the newly detected Y. This process may be repeated until the calculated torque output target value is substantially equal to the operating torque output, which indicates that the motor 104 is being controlled at an RPM and torque output which causes the HVAC system 100 to substantially reach or substantially achieve the operating mode target value during normal operation. As previously described, in some embodiments, such as embodiments employing a constant RPM motor, the fan control algorithm may receive a detected torque output as X in Equation 1, and may solve for a RPM target value as Y. In these embodiments, a load sensor 123 may be employed to detect the torque output.

Figure 6:
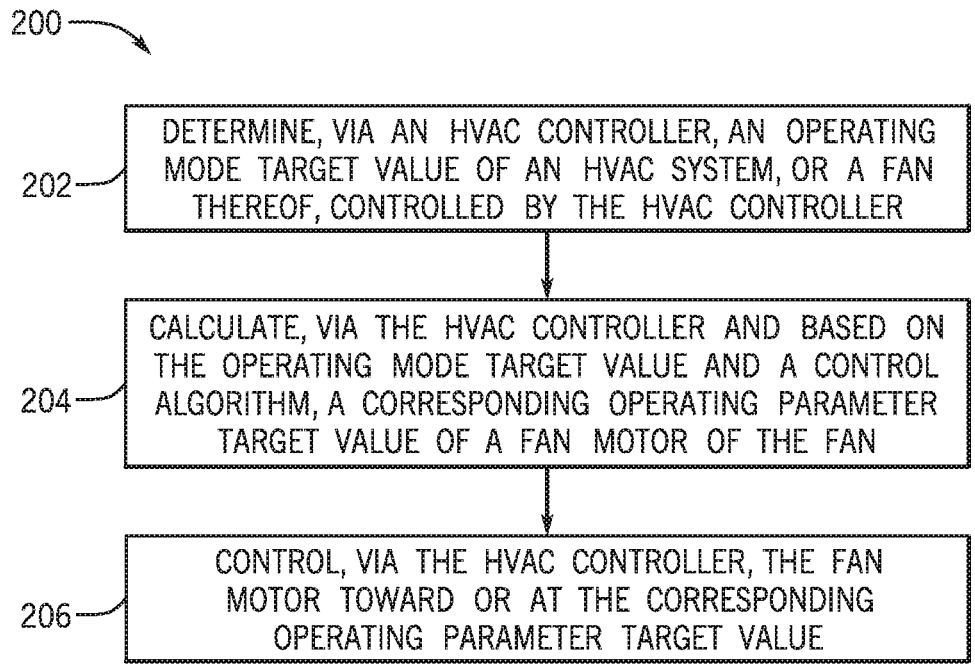
FIG. 6 is a process flow diagram illustrating a method of controlling a fan motor, via an HVAC controller and based on an operating mode target value and control algorithm, in accordance with embodiments described herein.

FIG. 6 is a process flow diagram illustrating an embodiment of a method 200 of controlling a fan motor, via an HVAC controller and based on an operating mode target value and fan control algorithm. In the illustrated embodiment, the method 200 includes determining (block 202), via an HVAC controller, an operating mode target value of an HVAC system controlled by the HVAC controller. In some embodiments, the HVAC controller may determine the operating mode target value by receiving a manual input. Additionally or alternatively, the HVAC controller may determine the operating mode target value based on feedback indicative of environmental or other conditions. For example, the HVAC controller may receive the operating mode target value from a thermostat input. The operating mode target value may be referred to as an "operating mode target demand," or a "demand," meaning that the HVAC controller seeks to regulate operation of the fan motor in order to meet the demanded operating mode target value. As previously described, the operating mode target value may be a constant airflow mode target value, a constant power consumption mode target value, a constant sound output mode target value, or a constant external static pressure mode target value, or some other operating mode target value.

The illustrated method 200 also includes calculating (block 204), via the HVAC controller and based on the operating mode target value and control algorithm, a corresponding operating parameter target value of a fan motor of the HVAC system. For example, the HVAC controller may input the operating mode target value into a fan control algorithm, such as Equation 1 noted in the description above. That is, the operating mode target value may be input as Z in Equation 1. As previously described, coefficients A, B, C, and D of Equation 1 may be previously determined based on a baselining procedure, and the coefficients are generally indicative of fan design and the selection of Z, for example selection of constant airflow, constant sound output, or constant power consumption. The operating RPM of the fan may also be detected, for example by a speed sensor as previously described, and entered to Equation 1. After inputting the operating mode target value as Z and the detected RPM as X, Y can be determined, where Y is indicative of the torque output target value of the fan motor. As previously described, Y may be a parameter indicative of torque output, such as amperes, back EMF, or PWM input.

The method 200 also includes controlling (block 206), via the HVAC controller, the fan motor toward or at the operating parameter target value to drive rotation of a fan of the HVAC system. For example, the HVAC controller may provide a signal to the fan motor suitable for operating the fan motor at the calculated torque output target value. Since the fan previously operated at a different torque output, the HVAC controller may instruct a change to the torque output, for example by modulating or changing the Voltage or current provided to the fan motor via the signal. As the torque output changes, the RPM may also change. Thus, after operating the fan motor toward or at the calculated torque output target value, the HVAC controller may again consult Equation 1, the fan control algorithm, by entering the operating mode target value and the newly detected RPM, and solving for the torque output target value or the parameter indicative thereof. The HVAC controller may then control the fan motor toward or at the newly calculated torque output target value. This iterative process may be repeated until no change to torque output, or more specifically no change to the control signal which controls torque output of the fan motor, is required.

Blocks 204 and 206 of FIG. 6 are described above with respect to an embodiment in which the calculated operating parameter target value is a desired torque output. For example, as noted above, Equation 1 receives the operating mode target value as Z, receives the detected RPM of the fan as X, and then solves for the target torque output, Y. This formulation is applicable, for example, to a constant torque motor. However, Equation 1 is also applicable to an embodiment which utilizes a constant RPM motor. That is, Equation 1 may receive the operating mode target value as Z, but instead of receiving a detected RPM and solving for a target torque output, Equation 1 may receive a detected torque output and solve for a target RPM. The HVAC controller may then control the motor, for example the constant RPM motor, at or toward the target RPM, which may change the torque output of the motor. Thus, a newly detected torque output would be entered to Equation 1 along with the operating mode target demand, and is solved for a new target RPM. This iterative process may be carried out until the actual operating RPM is substantially equal to the calculated target RPM. Of course, the coefficients of Equation 1 would differ between embodiments utilizing a constant RPM motor and a constant torque motor since the coefficients are dependent on fan design. It should be noted that FIGS. 7-10 below, in particular FIGS. 7-9, may be described with an emphasis on the constant torque motor, but that the same operating modes and features are applicable to a constant RPM motor. FIG. 11 and the corresponding description will further illustrate and describe the embodiment utilizing the constant RPM motor.

Figure 7:
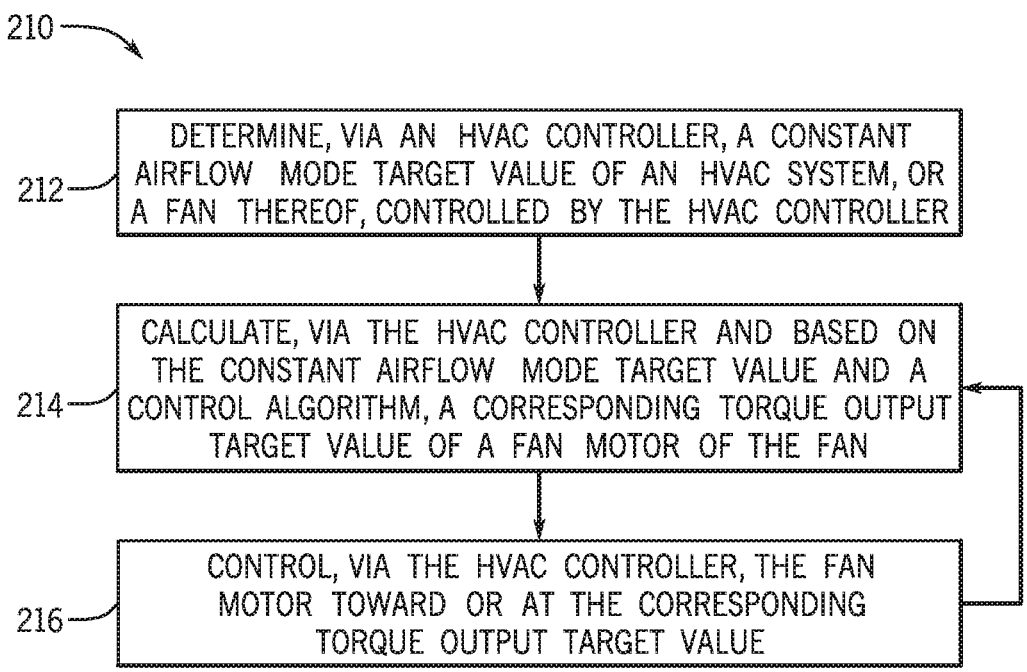
FIG. 7 is a process flow diagram illustrating a method of controlling a fan motor, via an HVAC controller and based on a constant airflow mode target value and control algorithm, in accordance with embodiments described herein.

FIG. 7 is a process flow diagram illustrating an embodiment of a method 210 of controlling a fan motor, via an HVAC controller and based on a constant airflow mode target value and control algorithm. In the illustrated embodiment, the method 210 includes determining (block 212), via an HVAC controller, a constant airflow mode target value of an HVAC system, or fan thereof, controlled by the HVAC controller. In some embodiments, the HVAC controller may determine the constant airflow mode target value by receiving a manual input. Additionally or alternatively, the HVAC controller may determine the constant airflow mode target value based on feedback indicative of environmental or other conditions. For example, the HVAC controller may receive the constant airflow mode target value from a thermostat input.

The illustrated method 210 also includes calculating (block 214), via the HVAC controller and based on the constant airflow mode target value and control algorithm, a corresponding torque output target value of the fan motor of the HVAC system. For example, the HVAC controller may input the constant airflow mode target value into a fan control algorithm, such as Equation 1 noted in the description above. That is, the constant airflow mode target value may be input as Z in Equation 1. As previously described, coefficients A, B, C, and D of Equation 1 may be previously determined based on a baselining procedure, and the coefficients are generally indicative of fan design and the selection of Z, in this case a constant airflow mode target value. The operating RPM of the fan may also be detected, for example by a speed sensor as previously described, and entered to Equation 1. After inputting the constant airflow mode target value as Z and the detected RPM as X, Y can be determined, where Y is indicative of a desired torque output of the fan motor. As previously described, Y may be a parameter indicative of the desired torque output, such as amperes, back EMF, or PWM input.

The method 210 also includes controlling (block 216), via the HVAC controller, the fan motor toward or at the torque output target value to drive rotation of a fan of the HVAC system. For example, the HVAC controller may provide a signal to the fan motor suitable for operating the fan motor at the calculated torque output target value. Since the fan previously operated at a different torque output, the HVAC controller may instruct a change to the torque output, for example by modulating or changing the Voltage or current provided to the fan motor via the signal. As the torque output changes, the RPM may also change. Thus, after operating the fan motor toward or at the calculated torque output target value, the HVAC controller may again consult Equation 1, the fan control algorithm, by entering the constant airflow mode target value and the newly detected RPM, and solving for the torque output target value or the parameter indicative thereof. The HVAC controller may then control the fan motor toward or at the newly calculated torque output target value. This iterative process may be repeated until no change to torque output, or more specifically no change to the control signal which controls torque output of the fan motor, is required.

Figure 8:
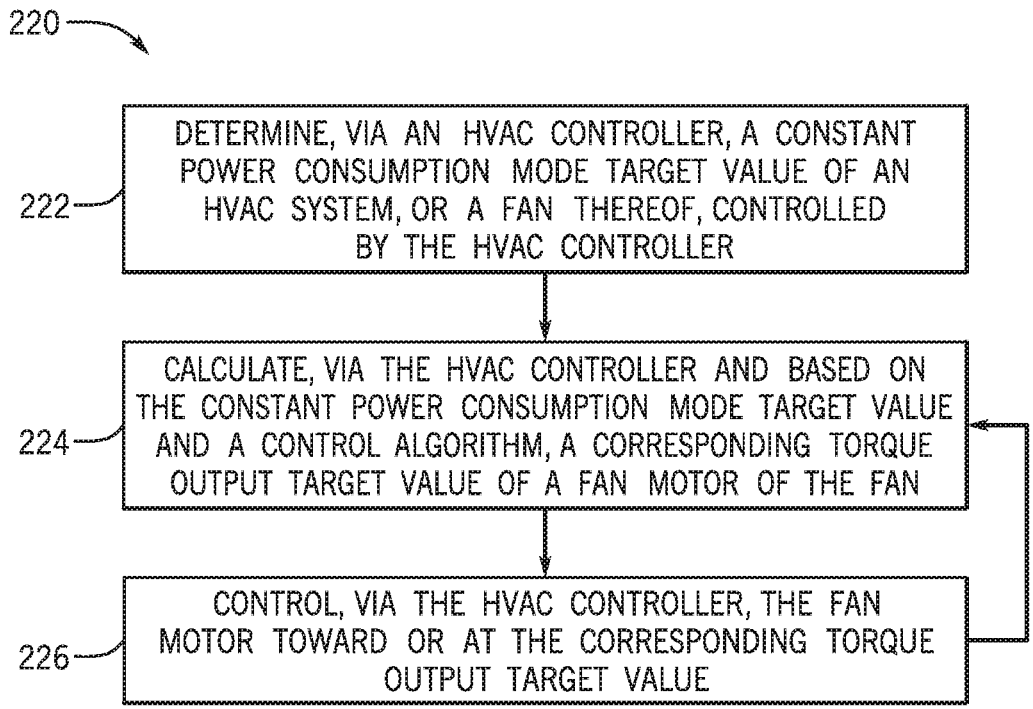
FIG. 8 is a process flow diagram illustrating a method of controlling a fan motor, via an HVAC controller and based on a constant power consumption mode target value and control algorithm, in accordance with embodiments described herein.

FIG. 8 is a process flow diagram illustrating an embodiment of a method 220 of controlling a fan motor, via an HVAC controller and based on a constant power consumption mode target value and control algorithm. The "constant power consumption mode target value" may refer to a power consumption by the fan motor. In the illustrated embodiment, the method 220 includes determining (block 222), via an HVAC controller, a constant power consumption mode target value of an HVAC system, or fan thereof, controlled by the HVAC controller. The constant power consumption mode target value may refer to a power consumption of the fan motor of the fan of the HVAC system. In some embodiments, the HVAC controller may determine the constant power consumption mode target value by receiving a manual input. Additionally or alternatively, the HVAC controller may determine the constant power consumption mode target value based on feedback indicative of environmental or other conditions. For example, the HVAC controller may receive the constant power consumption mode target value from a thermostat input, or the constant power consumption mode target value may be based on a schedule stored on, or entered to, the HVAC controller or another device of the HVAC system. The constant power consumption mode target value may include units of Watts, although other units are possible, including units normalized as a function of airflow.

The illustrated method 220 also includes calculating (block 224), via the HVAC controller and based on the constant power consumption mode target value and control algorithm, a corresponding torque output target value of the fan motor of the HVAC system. For example, the HVAC controller may input the constant power consumption mode target value into a fan control algorithm, such as Equation 1 noted in the description above. That is, the constant power consumption mode target value may be input as Z in Equation 1. As previously described, coefficients A, B, C, and D of Equation 1 may be previously determined based on a baselining procedure, and the coefficients are generally indicative of fan design and the selection of Z, in this case a constant power consumption mode target value. The operating RPM of the fan may also be detected, for example by a speed sensor as previously described, and entered to Equation 1. After inputting the constant power consumption mode target value as Z and the detected RPM as X, Y can be calculated, where Y is indicative of the torque output target value of the fan motor. As previously described, Y may be a parameter indicative of torque output, such as amperes, back EMF, or PWM input.

The method 220 also includes controlling (block 226), via the HVAC controller, the fan motor toward or at the torque output target value to drive rotation of a fan of the HVAC system. For example, the HVAC controller may provide a signal to the fan motor suitable for operating the fan motor at the calculated torque output target value. Since the fan previously operated at a different torque output, the HVAC controller may instruct a change to the torque output, for example by modulating or changing the Voltage or current provided to the fan motor via the signal. As the torque output changes, the RPM may also change. Thus, after operating the fan motor toward or at the calculated torque output, the HVAC controller may again consult Equation 1, the fan control algorithm, by entering the constant power consumption mode target value and the newly detected RPM, and solving for the torque output target value or the parameter indicative thereof. The HVAC controller may then control the fan motor toward or at the newly calculated torque output. This iterative process may be repeated until no change to torque output, or more specifically no change to the control signal which controls torque output of the fan motor, is required.

Figure 9:
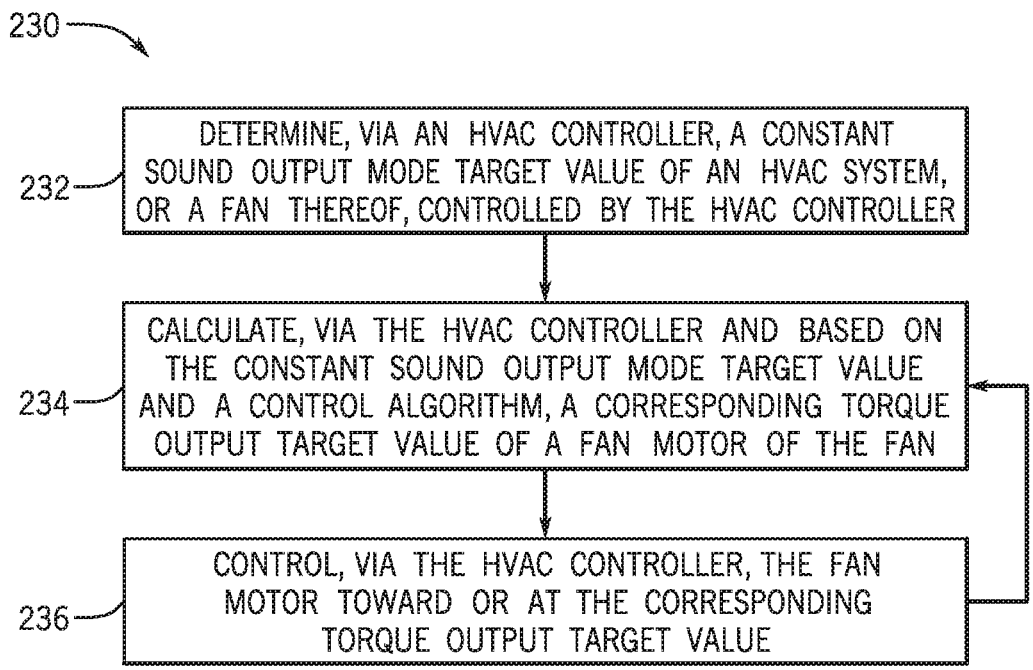
FIG. 9 is a process flow diagram illustrating a method of controlling a fan motor, via an HVAC controller and based on a constant sound output mode target value and control algorithm, in accordance with embodiments described herein.

FIG. 9 is a process flow diagram illustrating an embodiment of a method 230 of controlling a fan motor, via an HVAC controller and based on a constant sound output mode target value and control algorithm. In the illustrated embodiment, the method 230 includes determining (block 232), via an HVAC controller, a constant sound output mode target value of an HVAC system, or fan thereof, controlled by the HVAC controller. The constant sound output mode target value may refer to a sound output by the HVAC system and associated with fan operation. The constant sound output mode target value may refer to inlet sound, discharge sound, radiated sound, or a combination of inlet, discharge, and/or radiated sound. Separate control algorithms may be employed for inlet sound, discharge sound, radiated sound, and/or combinations thereof. Equation 1 may be utilized for each of these sound modes, although it should be noted that the coefficients A, B, C, and D may differ for each sound mode. That is, separate models may be employed for each of the above-referenced types of constant sound modes. In some embodiments, the HVAC controller may determine the constant sound output mode target value by receiving a manual input. Additionally or alternatively, the HVAC controller may determine the constant sound output mode target value based on feedback indicative of environmental or other conditions. For example, the HVAC controller may receive the constant sound output mode target value from a thermostat input, or the constant sound output mode target value may be based on a schedule stored on, or entered to, the HVAC controller or another device of the HVAC system. As previously described, the constant sound output mode target value may include units of decibels, although other units are possible.

The illustrated method 230 also includes calculating (block 234), via the HVAC controller and based on the constant sound output mode target value and control algorithm, a corresponding torque output target value of the fan motor of the HVAC system. For example, the HVAC controller may input the constant sound output mode target value into a fan control algorithm, such as Equation 1 noted in the description above. That is, the constant sound output mode target value may be input as Z in Equation 1. As previously described, coefficients A, B, C, and D of Equation 1 may be previously determined based on a baselining procedure, and the coefficients are generally indicative of fan design and the selection of Z, in this case a constant sound output mode target value. The operating RPM of the fan may also be detected, for example by a speed sensor as previously described, and entered to Equation 1. After inputting the constant sound output mode target value as Z and the detected RPM as X, Y can be determined, where Y is indicative of the torque output target value of the fan motor. As previously described, Y may be a parameter indicative of torque output, such as amperes, back EMF, or PWM input.

The method 230 also includes controlling (block 236), via the HVAC controller, the fan motor toward or at the torque output target value to drive rotation of the fan. For example, the HVAC controller may provide a signal to the fan motor suitable for operating the fan motor at the calculated torque output target value. Since the fan previously operated at a different torque output, the HVAC controller may instruct a change to the torque output, for example by modulating or changing the Voltage or current provided to the fan motor via the signal. As the torque output changes, the RPM may also change. Thus, after operating the fan motor toward or at the calculated torque output, the HVAC controller may again consult Equation 1, the fan control algorithm, by entering the constant sound output mode target value and the newly detected RPM, and solving for the torque output or the parameter indicative thereof. The HVAC controller may then control the fan motor toward or at the newly calculated torque output target value. This iterative process may be repeated until no change to torque output, or more specifically no change to the control signal which controls torque output of the fan motor, is required.

Figure 10:
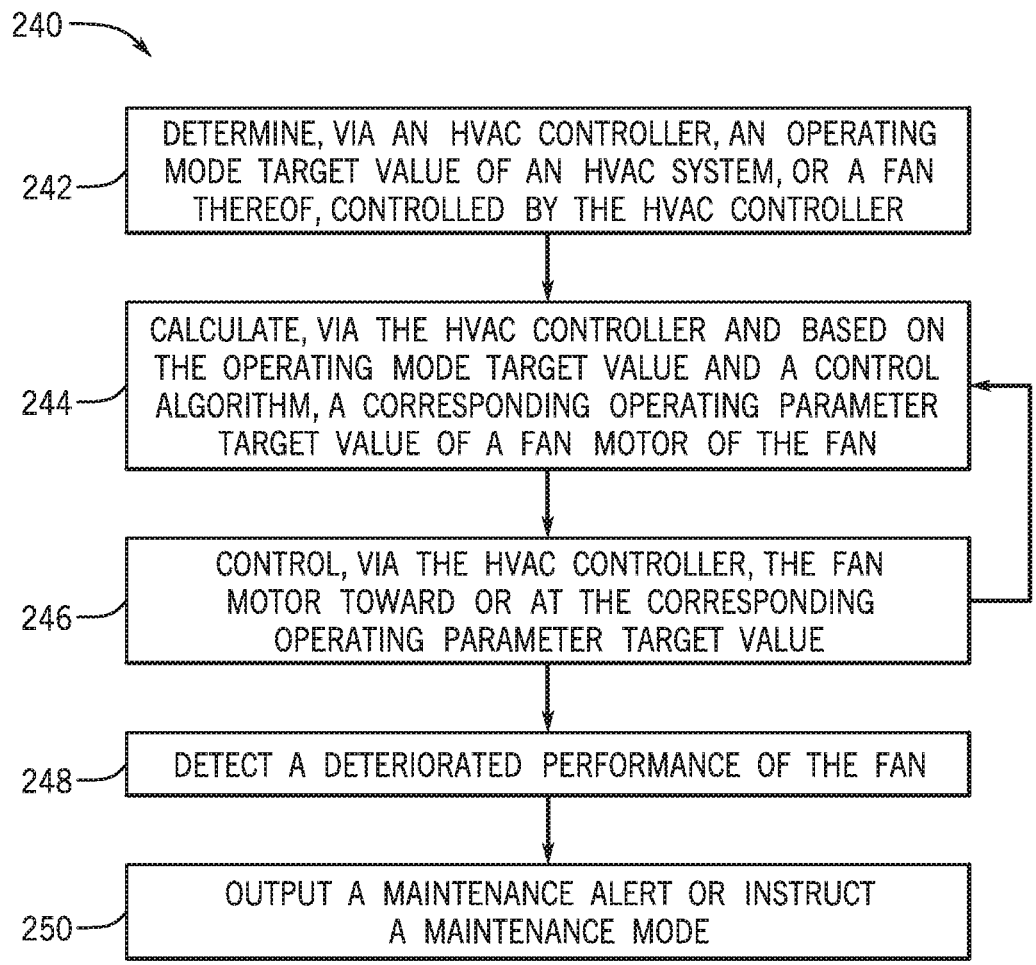
FIG. 10 is a process flow diagram illustrating a method of maintaining or cleaning an HVAC system or portion thereof, based on motor performance analysis by the HVAC controller, in accordance with embodiments described herein.

FIG. 10 is a process flow diagram illustrating a method 240 of maintaining or cleaning an HVAC system or portion thereof, based on motor performance analysis by the HVAC controller, in accordance with embodiments described herein. In the illustrated embodiment, the method 240 includes determining (block 242), via an HVAC controller, an operating mode target value of an HVAC system, or fan thereof, controlled by the HVAC controller. In some embodiments, the HVAC controller may determine the operating mode target value by receiving a manual input. Additionally or alternatively, the HVAC controller may determine the operating mode target value based on feedback indicative of environmental or other conditions. For example, the HVAC controller may receive the operating mode target value from a thermostat input. The operating mode target value may be referred to as an "operating mode target demand," meaning that the HVAC controller seeks to regulate operation of the fan motor to meet the demanded operating mode target value. As previously described, the operating mode target value may be a constant airflow mode target value, a constant power consumption mode target value, a constant sound output mode target value, a constant external static pressure mode target value.

The illustrated method 240 also includes calculating (block 244), via the HVAC controller and based on the operating mode target value and control algorithm, a corresponding operating parameter target value of a fan motor of the HVAC system, such as a corresponding torque output target value of the fan motor of the HVAC system. For example, the HVAC controller may input the operating mode target value into a fan control algorithm, such as Equation 1 noted in the description above. That is, the operating mode target value may be input as Z in Equation 1. As previously described, coefficients A, B, C, and D of Equation 1 may be previously determined based on a baselining procedure, and the coefficients are generally indicative of fan design and the selection of Z, for example where Z is equal to the constant operating mode target value. X may also be entered as the operating RPM of the fan, which may be detected by a speed sensor. After entering Z and X to Equation 1, Y can be determined, where Y is indicative of the operating parameter target value, such as torque output target value of the fan motor. As previously described, Y may be a parameter indicative of the torque output target value, such as amperes, back EMF, or PWM input.

The method 240 also includes controlling (block 246), via the HVAC controller, the fan motor at the operating parameter target value, such as the torque output target value. For example, the HVAC controller may provide a signal to the fan motor suitable for operating the fan motor at the calculated torque output target value or other operating parameter target value. The signal suitable for operating the fan motor at the calculated torque may be dependent on the type of fan motor employed, the operating mode, and/or the above-described determinations. As previously described, changing the torque output of the fan motor will also change the RPM. Thus, an iterative process may be conducted between blocks 244 and 246, as previously described, until the calculated torque output target value is substantially equal to the operating torque output and no change is instructed.

The method 240 also includes detecting (block 248), via the HVAC controller, a deteriorated performance of the HVAC system. If the HVAC controller detects the deteriorated performance, the HVAC controller may cease the iterative process described above, and proceed to block 250, as described below.

For example, the HVAC controller may detect the deteriorated performance in one or more of several ways. The fan motor may be a constant torque motor, and the HVAC controller may control the fan motor at the calculated operating torque by setting a control input, such as a PWM or other signal, to the fan motor. The HVAC controller may monitor the RPM of the fan motor to determine whether the RPM deviates from the expected RPM based on the constant torque control, for example via data feedback from the fan motor indicative of the fan speed. If the actual RPM deviates from the expected RPM by a threshold amount or more, a deteriorated fan performance may be detected, and may indicate the need for a cleaning or maintenance mode. Additionally or alternatively, airflow may be monitored by an airflow sensor to ensure that the expected airflow does not deviate from the operating airflow. Additionally or alternatively, the operating RPM and operating torque output of the fan motor may be recorded with respect to fan performance during the aforementioned baselining process, and the recorded values may serve as reference points for comparisons to operating values, where the comparison between the operating values and the reference points may indicate a deteriorated performance. After detecting the deteriorated performance, the HVAC controller may output (block 250) a maintenance alert or instruct (block 250) a maintenance mode, for example by instructing a fan reverse blow out mode.

FIG. 11 is a process flow diagram illustrating an embodiment of a method 260 of controlling a fan motor, via an HVAC controller and based on an operating mode target value and fan control algorithm. FIG. 11 may be illustrative of an embodiment of operating and controlling a constant RPM motor, as opposed to a constant torque motor. In the illustrated embodiment, the method 260 includes determining (block 262), via an HVAC controller, an operating mode target value of an HVAC system controlled by the HVAC controller. In some embodiments, the HVAC controller may determine the operating mode target value by receiving a manual input. Additionally or alternatively, the HVAC controller may determine the operating mode target value based on feedback indicative of environmental or other conditions. For example, the HVAC controller may receive the operating mode target value from a thermostat input. The operating mode target value may be referred to as an "operating mode target demand," or a "demand," meaning that the HVAC controller seeks to regulate operation of the fan motor in order to meet the demanded operating mode target value. As previously described, the operating mode target value may be a constant airflow mode target value, a constant power consumption mode target value, a constant sound output mode target value, or a constant external static pressure mode target value, or some other operating mode target value.

The illustrated method 260 also includes calculating (block 264), via the HVAC controller and based on the operating mode target value and control algorithm, a corresponding RPM target value of a fan motor of the HVAC system. For example, the HVAC controller may input the operating mode target value into a fan control algorithm, such as Equation 1 noted in the description above. That is, the operating mode target value may be input as Z in Equation 1. As previously described, coefficients A, B, C, and D of Equation 1 may be previously determined based on a baselining procedure, and the coefficients are generally indicative of fan design and the selection of Z, for example selection of constant airflow, constant sound output, or constant power consumption. The operating torque output of the fan or fan motor may also be detected, for example by a load sensor, and entered to Equation 1. After inputting the operating mode target value as Z and the detected torque output as X, Y can be determined, where Y is indicative of the RPM target value of the fan motor.

The method 260 also includes controlling (block 266), via the HVAC controller, the fan motor toward or at the RPM target value to drive rotation of a fan of the HVAC system. For example, the HVAC controller may provide a signal to the fan motor suitable for operating the fan motor at the calculated RPM target value. Since the fan previously operated at a different RPM, the HVAC controller may instruct a change to the RPM, for example by modulating or changing the Voltage or current provided to the fan motor via the signal. As the RPM changes via the input signal, the torque output may also change. Thus, after operating the fan motor toward or at the calculated RPM target value, the HVAC controller may again consult Equation 1, the fan control algorithm, by entering the operating mode target value and the newly detected torque output, and solving for the RPM target value. The HVAC controller may then control the fan motor toward or at the newly calculated RPM target value. This iterative process may be repeated until no change to RPM, or more specifically no change to the control signal which controls RPM of the fan motor, is required.

FIG. 12 is a process flow diagram illustrating an embodiment of a method 270 of controlling a fan motor, via an HVAC controller and based on an operating mode target value and control algorithm. In the illustrated embodiment, the fan control algorithm is employed in order to calculate threshold or boundary conditions by which the HVAC controller regulates operation of the fan motor. The threshold or boundary conditions may be calculated and enforced alongside, or in isolation from, the previously described operating modes. For example, one instance of the fan control algorithm may be employed by the HVAC controller to regulate the fan motor toward constant airflow operation, and another instance of the fan control algorithm may be employed to determine threshold/boundary conditions within which the HVAC controller regulates operation of the fan motor.

For example, the method 270 includes determining (block 272), via an HVAC controller, an operating mode threshold value of an HVAC system, or a fan motor thereof, controlled by the HVAC controller. The threshold value may relate to any of the disclosed operating modes, for example, the airflow, power consumption, sound, and pressure operating modes, and other operating modes contemplated by the present disclosure. That is, airflow thresholds, power consumption thresholds, sound thresholds, and/or pressure thresholds may be determined. These thresholds may relate to thermostat inputs or some other manually determined, such as manually entered, or automatically determined threshold.

The method 270 also includes calculating (block 274), via the HVAC controller and based on the operating mode threshold value and a control algorithm, a corresponding operating parameter threshold value of a fan motor of a fan. As previously described, the fan control algorithm includes Equation 1. When determining operating thresholds, Equation 1 may receive the operating mode threshold value and a detected operating parameter, such as a detected RPM. The HVAC controller may then solve Equation 1 for the operating parameter threshold value, such as torque output threshold value. Of course, if employing a constant RPM motor, Equation 1 may receive a detected torque output and solve for an RPM threshold value.

The method 270 also includes ensuring (block 276), via the HVAC controller, that the operating parameter threshold value is not exceeded by the fan motor or operation thereof. That is, after calculating the torque output threshold value or the RPM threshold value, the HVAC controller may operate the fan motor within the calculated threshold value. The threshold value(s) may include, for example, upper and/or lower limits. Further, the HVAC controller may operate the fan motor via one of the other operating modes while simultaneously employing the disclosed thresholds. Further still, the HVAC controller may operate the fan motor based on one type of operating mode, for example an airflow-based operating mode as previously described, while simultaneously employing thresholds of a different operating mode, for example power consumption and/or sound thresholds. That is, the HVAC controller can employ Equation 1, or the fan control algorithm, in a number of different contexts side-by-side or in isolation. Thus, the fan motor can be controlled without a separate fan motor controller and with new and improved operating modes. It should be noted that the general thresholds embodiment illustrate in, and described with respect to, FIG. 12 may be employed while the HVAC controller controls normal operation of the fan motor via any one of the methods disclosed with respect to FIGS. 5-11.

In accordance with the present disclosure, fan motor operation may be programmed into the control logic of an HVAC controller as described in detail above with reference to the drawings. Presently contemplated embodiments may improve efficiency, reduce cost, and enable improved HVAC functionality over traditional embodiments.

While only certain features and embodiments of the disclosure have been illustrated and described, many modifications and changes may occur to those skilled in the art, such as variations in sizes, dimensions, structures, shapes and proportions of the various elements, values of parameters including temperatures and pressures, mounting arrangements, use of materials, colors, orientations, etc., without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode of carrying out the disclosure, or those unrelated to enabling the claimed disclosure. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A heating, ventilation, and/or air conditioning (HVAC) system, comprising:
 a motor configured to drive rotation of a fan; and
 an HVAC controller configured to control operation of the HVAC system, wherein the HVAC controller is configured to:
  receive a first input indicative of a first detected value of a first operating parameter of the motor at a first point in time;
  determine an operating mode target value of the HVAC system;
  calculate a first target value of a second operating parameter of the motor based on a first iteration of a control algorithm that receives the first input indicative of the first detected value of the first operating parameter of the motor at the first point in time and a second input indicative of the operating mode target value of the HVAC system;
  control operation of the motor to the first target value of the second operating parameter of the motor such that the first operating parameter of the motor changes;
  receive a third input indicative of a second detected value of the first operating parameter of the motor at a second point in time after the first point in time;
  calculate a second target value of the second operating parameter of the motor based on a second iteration of the control algorithm that receives the third input indicative of the second detected value of the first operating parameter of the motor at the second point in time and the second input indicative of the operating mode target value of the HVAC system; and
  control operation of the motor to the second target value of the second operating parameter of the motor such that the HVAC system is operated at the operating mode target value.

2. The HVAC system of claim 1, wherein the HVAC controller is configured to determine the operating mode target value of the HVAC system by determining a constant airflow mode target value.

3. The HVAC system of claim 2, wherein the HVAC controller is configured to calculate the first target value of the second operating parameter of the motor based on the first iteration of the control algorithm by calculating a torque output target value of the motor.

4. The HVAC system of claim 1, wherein the HVAC controller is configured to determine the operating mode target value of the HVAC system by determining a constant power consumption mode target value.

5. The HVAC system of claim 1, wherein the HVAC controller is configured to determine the operating mode target value of the HVAC system by determining a constant sound output mode target value.

6. The HVAC system of claim 5, wherein the constant sound output mode target value comprises a constant inlet sound output mode target value, a constant radiated sound output mode target value, a constant discharge sound output mode target value, or a constant total sound output mode target value.

7. The HVAC system of claim 1, wherein the HVAC controller is configured to calculate the first target value of the second operating parameter of the motor based on the first iteration of the control algorithm by calculating a revolutions-per-minute (RPM) target value of the motor.

8. The HVAC system of claim 1, wherein the HVAC controller is configured to control a damper actuator of the HVAC system, a valve of the HVAC system, or both.

9. The HVAC system of claim 1, wherein the HVAC controller is configured to calculate the first target value of the second operating parameter of the motor based on the first iteration of the control algorithm by employing a non-linear, two variable regression analysis utilizing the control algorithm.

10. The HVAC system of claim 1, comprising a sensor configured to detect the first detected value of the first operating parameter of the motor at the first point in time, wherein the HVAC controller is configured to receive the first input indicative of the first detected value of the first operating parameter of the motor from the sensor.

11. The HVAC system of claim 1, wherein the first operating parameter of the motor corresponds to a torque of the motor and the second operating parameter of the motor corresponds to a revolutions-per-minute (RPM) of the motor.

12. The HVAC system of claim 1, wherein the first operating parameter of the motor corresponds to a revolutions-per-minute (RPM) of the motor and the second operating parameter of the motor corresponds to a torque of the motor.

13. A control system for a heating, ventilation, and/or air conditioning (HVAC) system, comprising:
a controller configured to:
receive a first input indicative of a first detected value of a first operating parameter of a fan motor at a first point in time;
determine an operating mode target value of the HVAC system;
calculate a first target value of a second operating parameter of the fan motor based on a first iteration of a control algorithm that receives the first input indicative of the first detected value of the first operating parameter of the fan motor at the first point in time and a second input indicative of the operating mode target value of the HVAC system;
control operation of the fan motor to the first target value of the second operating parameter such that the first operating parameter of the fan motor changes;
receive a third input indicative of a second detected value of the first operating parameter of the fan motor at a second point in time after the first point in time;
calculate a second target value of the second operating parameter of the fan motor based on a second iteration of the control algorithm that receives the third input indicative of the second detected value of the first operating parameter of the fan motor at the second point in time and the second input indicative of the operating mode target value of the HVAC system; and
control operation of the fan motor to the second target value of the second operating parameter such that the HVAC system is operated at the operating mode target value.

14. The control system of claim 13, wherein the controller comprises an HVAC unit controller.

15. The control system of claim 13, wherein the controller is configured to determine the operating mode target value of the HVAC system by determining a constant airflow mode target value.

16. The control system of claim 15, wherein the controller is configured to calculate the first target value of the second operating parameter of the fan motor based on the first iteration of the control algorithm by calculating a torque output target value of the fan motor.

17. The control system of claim 13, wherein the controller is configured to determine the operating mode target value of the HVAC system by determining a constant power consumption mode target value.

18. The control system of claim 13, wherein the controller is configured to determine the operating mode target value of the HVAC system by determining a constant sound output mode target value.

19. The control system of claim 18, wherein the constant sound output mode target value comprises a constant radiated sound output mode target value, a constant discharge sound output mode target value, or a constant total sound output mode target value.

20. The control system of claim 13, wherein the controller is configured to calculate the first target value of the second operating parameter of the fan motor based on the first iteration of the control algorithm by calculating a torque output target value of the fan motor.

21. The HVAC system of claim 13, wherein the controller is configured to calculate the first target value of the second operating parameter of the fan motor based on the first iteration of the control algorithm by employing a non-linear, two variable regression analysis utilizing the control algorithm.

22. The control system of claim 13, comprising a sensor configured to detect the first detected value of the operating parameter of the fan motor at the first point in time, and wherein the controller is configured to receive the first input indicative of the first detected value of the first operating parameter from the sensor.

23. A non-transitory computer readable storage media having computer-executable instructions that, when executed by a processor, perform a method of controlling a heating, ventilation, and/or air conditioning (HVAC) system, the instructions comprising:
determining an operating mode target value of the HVAC system;
receiving a first input indicative of a first detected value of a first operating parameter of a motor at a first point in time, the motor being configured to drive rotation of a fan;
calculating, based on a first iteration of a control algorithm that receives the first input indicative of the first detected value of the first operating parameter of the motor at the first point in time and a second input indicative of the operating mode target value of the HVAC system, a first target value of a second operating parameter of the motor;
controlling operation of the motor to the first target value of the second operating parameter of the motor such that the first operating parameter of the motor changes;
receiving a third input indicative of a second detected value of the first operating parameter of the motor at a second point in time after the first point in time;
calculating, based on a second iteration of the control algorithm that receives the third input indicative of the second detected value of the first operating parameter of the motor at the second point in time and the second input indicative of the operating mode target value of the HVAC system, a second target value of a the second operating parameter of the motor; and
controlling operation of the motor to the second target value of the second operating parameter of the motor such that the HVAC system is operated at the operating mode target value of the HVAC system.

24. The non-transitory computer readable storage media of claim 23, wherein receiving the operating mode target value of the HVAC system comprises receiving a constant airflow mode target value.

25. The non-transitory computer readable storage media of claim 23, wherein receiving the operating mode target value of the HVAC system comprises receiving a constant power consumption mode target value.

26. The non-transitory computer readable storage media of claim 23, wherein receiving the operating mode target value of the HVAC system comprises receiving a constant sound output mode target value.

27. The non-transitory computer readable storage media of claim 23, wherein calculating the first target value of the second operating parameter of the motor based on the first iteration of the control algorithm comprises calculating a torque output target value of the fan motor.

28. The non-transitory computer readable storage media of claim 23, wherein calculating, based on the first iteration of the control algorithm, the first target value of the second operating parameter of the motor comprises employing a non-linear, two variable regression analysis utilizing the control algorithm.

29. The non-transitory computer readable storage media of claim 23, wherein the detected first operating parameter of the motor corresponds to a revolutions-per-minute (RPM) of the motor, and wherein the second operating parameter of the motor corresponds to a torque output of the motor.

30. The non-transitory computer readable storage media of claim 23, wherein the first operating parameter of the motor corresponds to a torque output of the motor, and wherein the second operating parameter of the motor corresponds to a revolutions-per-minute (RPM) of the motor.

\* \* \* \* \*